United States Patent [19]
Nakagaki et al.

[11] Patent Number: 5,305,146
[45] Date of Patent: Apr. 19, 1994

[54] TRI-COLOR SEPARATING AND COMPOSING OPTICAL SYSTEM

[75] Inventors: Shintaro Nakagaki, Miura; Tsutou Asakura, Yokohama; Ryusaku Takahashi; Tetsuji Suzuki, both of Yokosuka; Fujiko Tatsumi, Yokohama, all of Japan

[73] Assignee: Victor Company of Japan, Ltd., Yokohama, Japan

[21] Appl. No.: 903,564

[22] Filed: Jun. 24, 1992

[30] Foreign Application Priority Data

Jun. 26, 1991 [JP] Japan .............................. 3-057617[U]
Jan. 29, 1992 [JP] Japan .............................. 4-008464[U]

[51] Int. Cl.$^5$ .......................... G02B 27/14; G02B 5/30
[52] U.S. Cl. .................................. 359/634; 359/637; 359/497; 359/483
[58] Field of Search ............... 359/710, 634, 637, 497, 359/483

[56] References Cited

U.S. PATENT DOCUMENTS

| | | | |
|---|---|---|---|
| 3,794,407 | 2/1974 | Nishimura | 359/634 |
| 3,914,787 | 10/1975 | Sekiguchi | 359/634 |
| 4,541,688 | 9/1985 | Watt et al. | 359/634 |
| 5,130,826 | 7/1992 | Takanashi et al. | 359/40 |
| 5,200,857 | 4/1993 | Matsushita | 359/634 |

FOREIGN PATENT DOCUMENTS 3-170925 7/1991 Japan .

Primary Examiner—Richard A. Bertsch
Assistant Examiner—Charles G. Freay
Attorney, Agent, or Firm—Michael N. Meller

[57] ABSTRACT

Color separating or composing optical system having an optical axis wherein at least one color filter is placed obliquely to the optical axis to perform color separation or composition by color-selective reflection and passing of lights proceeding along the optical axis, a cylindrical lens is placed in an optical path of a light passing the color filter, another feature of this invention is that two color filters are placed obliquely with respect to the optical axis to perform color separation or composition by color-selective reflection and passing of lights proceeding along the optical axis, and are arranged in configuration as such that an imaginary plane defined to include the optical axis and a line perpendicular to one of the two color filters, is perpendicular to another imaginary plane defined to include the optical axis and another line perpendicular to the other of the two color filters.

2 Claims, 9 Drawing Sheets

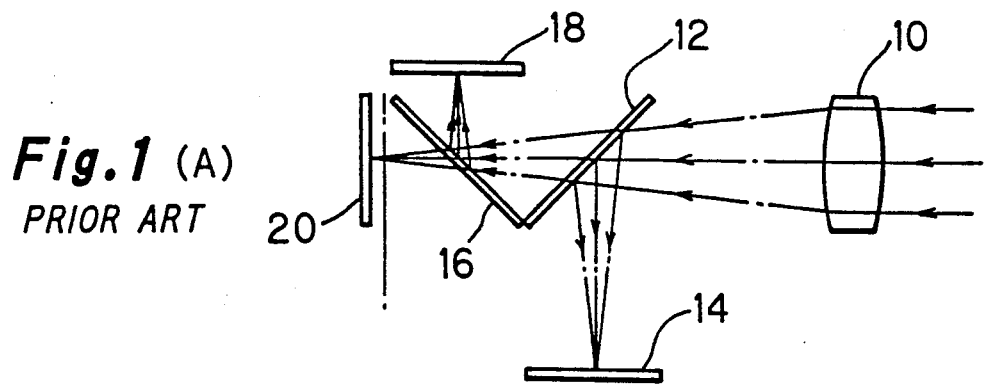
Fig.1 (A) PRIOR ART
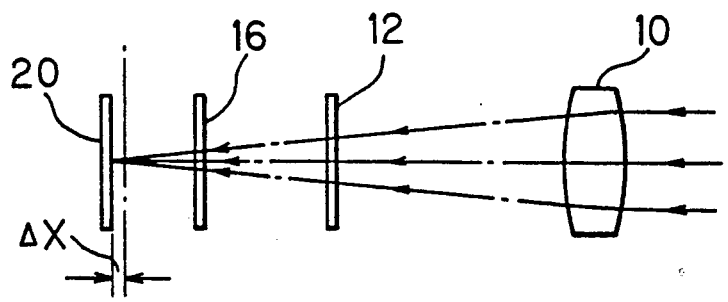
Fig.1 (B) PRIOR ART
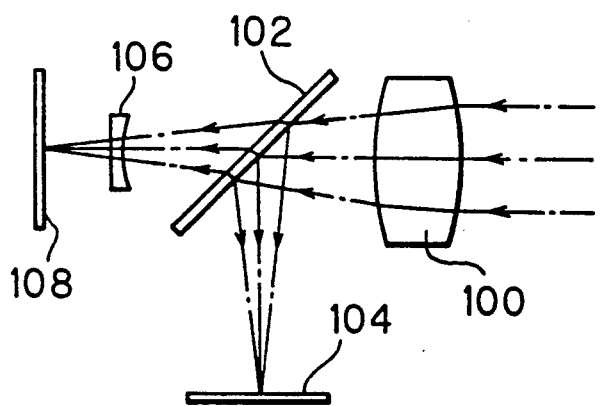
Fig.2 (A)
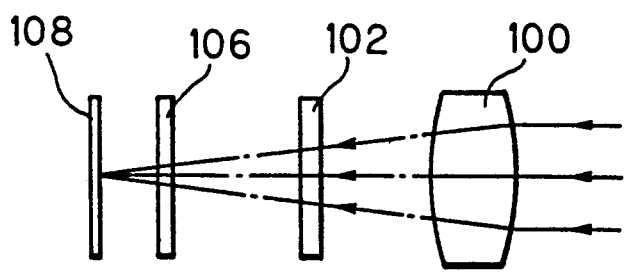
Fig.2 (B)

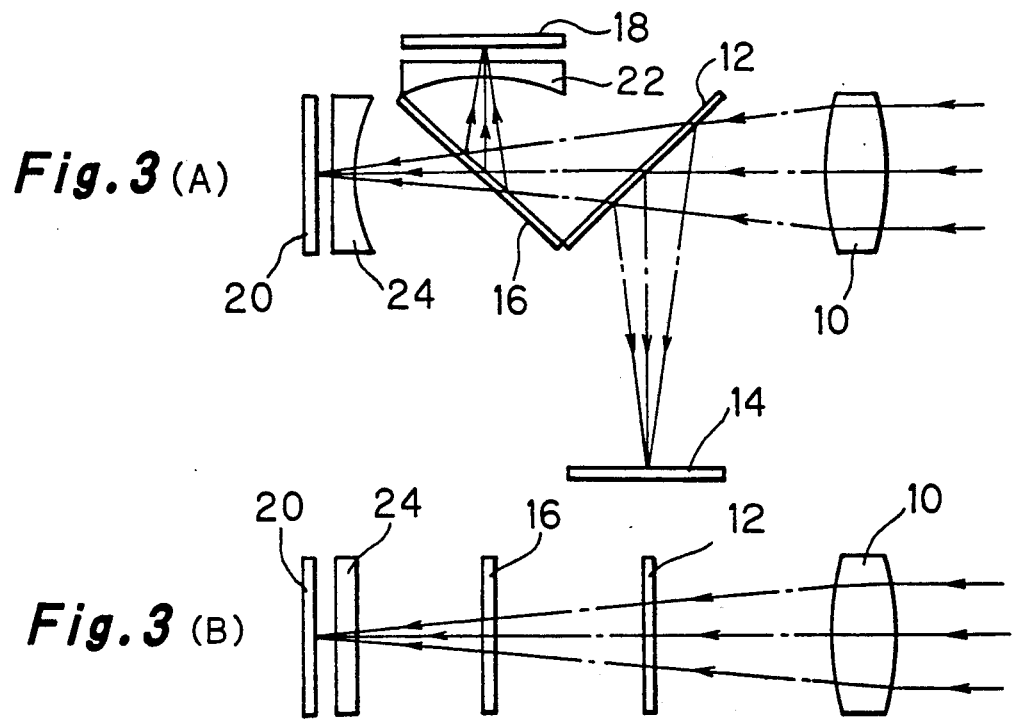
Fig.3 (A)
Fig.3 (B)
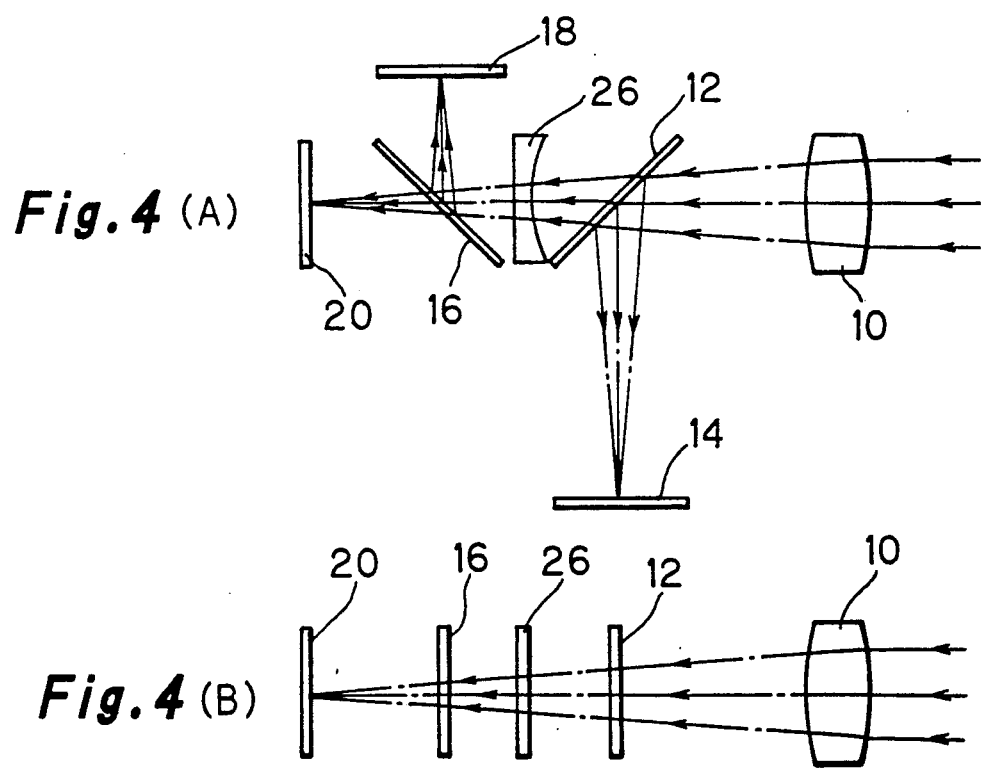
Fig.4 (A)
Fig.4 (B)

TRI-COLOR SEPARATING AND COMPOSING OPTICAL SYSTEM

BACKGROUND OF THE INVENTION

1. Field of the Invention

The present invention relates to an improvement of a color separating and composing optical system suitable for color separation and composition in such as recording and reproducing devices of picture images.

2. Description of the Related Art

A color separation prism is well-known as a color separating/composing optical system. Although one advantage of this kind of prism is that the back-focus is short, it has also many disadvantages of spherical aberration, astigmatism, coma, curvature of the field, image distortion, chromatic aberration, etc. It is possible to correct these aberrations with an imaging lens used together with the color separation prism, but its correction is limited.

In addition, as such a lens must be specially manufactured so as to match with the length of the prism, it is unsatisfactory in both performance and cost. Further, it has disadvantages of such as glass distortion and large half-widths of P- and S-polarized lights in dichroic properties. Accordingly, it is especially undesirable when birefringent optical elements are involved.

On the other hand, it is conceivable to devise a color separating/composing optical system having a long backfocus, which employs multiple dichroic mirrors in combination (as shown in FIG. 1). FIG. 1(A) is a view from the sagittal plane and FIG. 1(B) is that from the meridional plane for "G" (green) (the same applies to FIGS. 2–8 and 15).

In FIG. 1, the light having entered from the imaging lens 10 impinges first on a platelike "B" (blue) reflecting dichroic mirror 12 to reflect the "B" light, which forms an image on the image plane 14. On the other hand, the light having passed the mirror 12 impinges on a platelike "R" (red) reflecting dichroic mirror 16 to reflect "R" light, which forms an image on the image plane 18. The "G" light having passed the mirror 16 forms an image on the image plane 20.

Problems to be solved by the Invention

The above techniques, however, cause a problem of such that the best image point in the "G" channel in the sagittal plane is offset by $\Delta X$ from that in the meridional plane. In the R channel, astigmatism of about half of $\Delta X$ in the "G" channel occurs while such effect does not occur in the "B" channel.

Such astigmatism significant in the paraxial region could be corrected by providing an imaging lens having inverse astigmatism, but such correction by using the imaging lens requires designing a different degree of correction for each optical system, thus it would be undesirable for production and cost.

Considering these points, and paying particular attention to the fact that almost all aberrations are astigmatic, the present invention is intended to reduce astigmatism in color separation and composition thereby improving image resolution of optical system with lower cost.

SUMMARY OF THE INVENTION

In a color separating and composing optical system where at least one platelike color filter is arranged to be tilted with respect to the optical axis and color separation and color composition are performed utilizing the reflection and penetration of light by the filter, one of the features of the present invention is that a cylindrical lens is placed in the optical path of the light that has passed the above color filter.

Another feature of the present invention is that, in a color separating and composing optical system where two platelike color filters are tilted with respect to the optical axis common to the two filters by being rotated about their rotational axes and color is separated or composed by utilizing reflection and passing of light by these color filters, these filters are arranged so that the respective rotational axes thereof, is twisted each other in directional relationship in respective parallel planes both perpendicular to a straight optical axis common to the two filters.

Still another feature of the present invention is that, in a color separating/composing system where multiple color filters are placed, a reading light obtained through a polarizing device is subject to color separation, each of the color separated reading lights impinges on a reflection-type spatial light modulator which is formed by laminating at least a photoconductive layer, a mirror layer, and a photomodulation layer (in this order) between a pair of transparent electrodes. The color separated reading light is modulated by the photomodulation layer and reflected by the mirror layer and finally the color separated reading lights are combined to form a beam of light. The arrangement of the multiple filters for the reading light is done in consideration of the wavelength dependent sensitivity of the photoconductive layer and the wavelength response change caused in the polarizing device.

FIG. 2 shows an example of the basic arrangement of the color separating/composing optical system in accordance with the present invention. Light having been passing through the imaging optical system 100 enters the color filter 102, where the incident light is reflected or passing depending on its color. The reflected light forms an image on the image plane 104, and the light that passed forms an image on the image plane 108 through a cylindrical lens 106.

In the present invention, the cylindrical lens 106, placed in the optical path of the light that has passed the color filter, elongates the imaging (image forming) distance of the passed light in the sagittal plane shown in FIG. 2(A). This makes the position of the imaging point identical with that in the meridional plane, as shown in FIG. 2(B). Furthermore, another feature of the invention is an arrangement of two color filters planes of which are in twisted relationship. This allows the astigmatism of the light caused in the passing filters to cancel.

Still another feature of the present invention, is that, when a reflection-type spatial light modulator is used, the color filters are placed in consideration of the wavelength dependent sensitivity response of the photoconductive layer and the wavelength band of polarized lights for reading, i.e. polarization of reading lights is carefully selected by the color filter arrangement (dichroic mirrors) to minimize the overlap between the sensitivity response of the photoconductive layer and the band of polarized reading light. Accordingly, a less overlapping polarized light is projected to the light modulator as the reading light which subjects less to the photoconductive layer thereof. This prevents reduction of effective sensitivity in the spatial light modulator element, thus improves the contrast ratio of displayed images.

BRIEF DESCRIPTION OF THE DRAWINGS

FIGS. 1(A and B) is a drawing showing the schematic diagram showing a prior-art color separating-/composing optical system.

FIGS. 2(A and B) is an explanatory drawing showing the basic arrangement of the color separating/composing optical system according to the present invention.

FIGS. 3(A and B) is a drawing showing the schematic diagram of a first embodiment according to the present invention.

FIGS. 4(A and B) is a drawing showing the schematic diagram of a second embodiment according to the present invention.

DETAILED DESCRIPTION OF THE PREFERRED EMBODIMENTS

Figure 5:
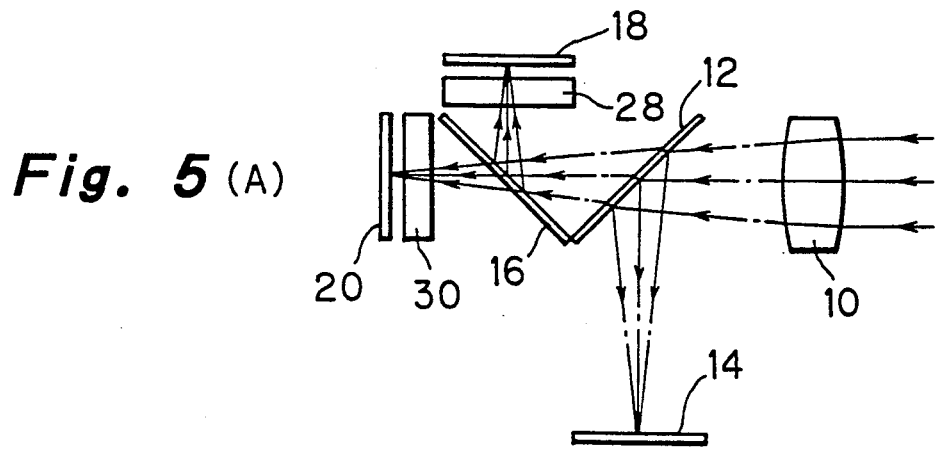
FIGS. 5(A and B) is a drawing showing the schematic diagram of a third embodiment according to the present invention.
Figure 5:
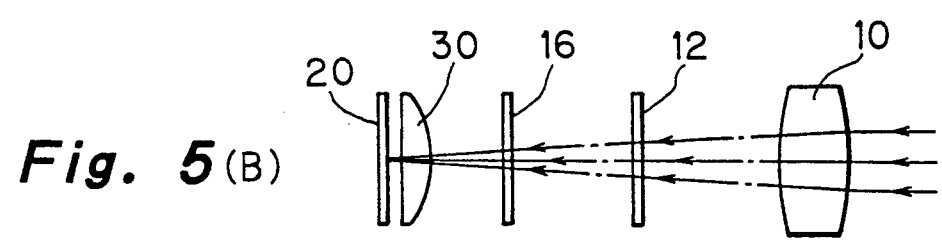

Some embodiments of the color separating/composing optical system according to the present invention are explained hereafter, making reference to the attached drawings. Identical symbols are assigned to the constituents similar or corresponding to those of the above-mentioned prior-art examples.

EMBODIMENT 1

First, based on an optical arrangement of FIG. 3, an explanation is given concerning the Embodiment 1 of the present invention. In FIG. 3, 22 is a negative cylindrical lens for "R" light (hereinafter called "R" cylindrical lens) placed between the light reflecting side of the "R" reflecting dichroic mirror 16 and the "R" imaging plane 18. FIG. 3 also shows another negative cylindrical lens 24 for "G" light (hereinafter called "G" cylindrical lens) between the light passing side of the "R" reflecting dichroic mirror 16 and the "G" imaging mirror 20. The other components are the same as the conventional ones shown in FIG. 1.

According to this embodiment, the "R" light reflected by the "R" reflecting dichroic mirror 16 impinges on the image plane 18 through the "R" cylindrical lens 22, and the "G" light having passed the mirror 16 impinges on the image plane 20 through the "G" cylindrical lens 24. In this case, the effect of the "R" and "G" cylindrical lenses 22 and 24 elongates the imaging distance in the sagittal plane, thereby causing the image point in the sagittal plane to fall on that in the meridional plane. In other words, the respective image points in both the sagittal and meridional planes coincide each other.

EMBODIMENT 2

Next, the Embodiment 2 is explained by making reference to FIG. 4. In this embodiment, a negative cylindrical lens 26 is installed between the "B" reflecting dichroic mirror 12 and the "R" reflecting dichroic mirror 16. That is, the cylindrical lens 26 is placed in the optical path common to both of the lights "R" and "G". Therefore, the cylindrical lens 26 subjects the light of both "R" and "G", giving the best imaging point at the same position in both the "R" image plane 18 and the "G" image plane 20.

EMBODIMENT 3

Next, referred to FIG. 5, the Embodiment 3 is explained. In this embodiment, positive cylindrical lenses 28 and 30 are placed instead of negative cylindrical lenses 22 and 24 in the Embodiment 1 shown in FIG. 3. As a result, the imaging distances in the meridional plane for both "R" and "G" lights are shortened by the cylindrical lenses 28 and 30, so that the imaging point in the meridional plane is at the same position as that in the sagittal plane.

EMBODIMENT 4

Figure 6:
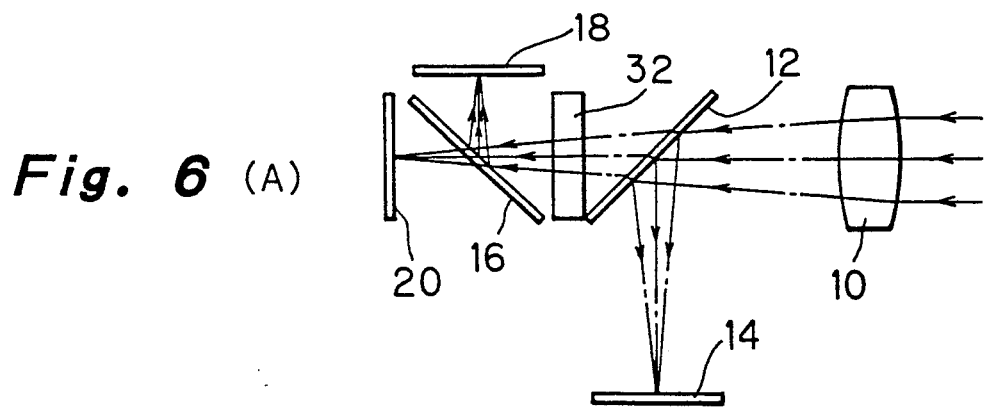
FIGS. 6(A and B) is a drawing showing the schematic diagram of a fourth embodiment according to the present invention.
Figure 6:
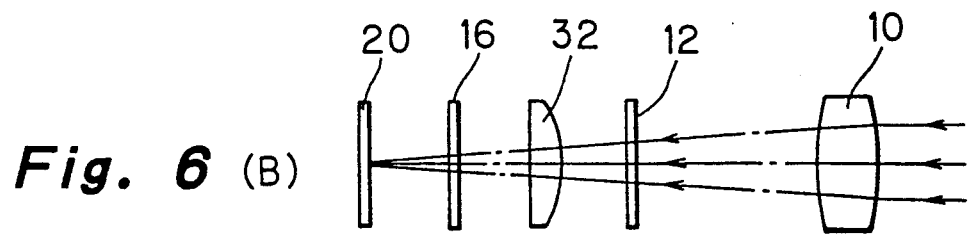

Next, referred to FIG. 6, the Embodiment 4 is explained. In this embodiment, an positive cylindrical lens 32 is placed in place of the negative cylindrical lens 26 in the Embodiment 2 shown in FIG. 4. Because of this, the image distances for "R" and "G" lights in the meridional plane are shortened in common by the positive cylindrical lens 32, making the position of the imaging point of the meridional plane identical with that in the sagittal plane.

EMBODIMENT 5

Figure 7A:
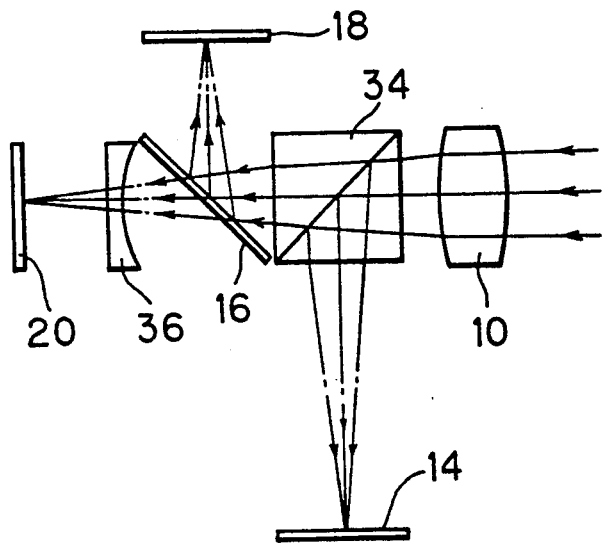
FIGS. 7(A and B) is a drawing showing the schematic diagram of a fifth embodiment according to the present invention.
Figure 7B:
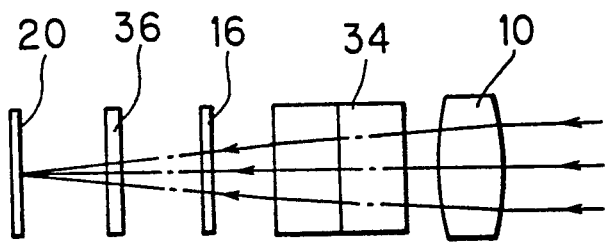

Next, referred to FIG. 7, the Embodiment 5 is explained. In this embodiment, a "B" reflecting dichroic prism 34 is placed in place of the "B" reflecting dichroic mirror 12 in the Embodiment 4. Furthermore, a negative "G" cylindrical lens 36 is placed between the light passing side of the "R" reflecting dichroic mirror 16 and the image plane 20 of "G".

In this embodiment, the "B" reflecting dichroic prism 34 shortens the back-focus of the imaging lens 10. Furthermore, the "G" cylindrical lens 36 lengthens the imaging distance in the sagittal plane of "G" light, producing an imaging point identical with that in the meridional plane.

In general, a prism has a merit of shortening a back-focus, but has demerits with respect to its performance and cost. On the other hand, a dichroic mirror and a cylindrical lens have merits of lower astigmatism, improved resolving power, and reduced cost, but their demerit is a long back-focus. In this regard, the Embodiment 5 provides an intermediate solution.

EMBODIMENT 6

Figure 8A:
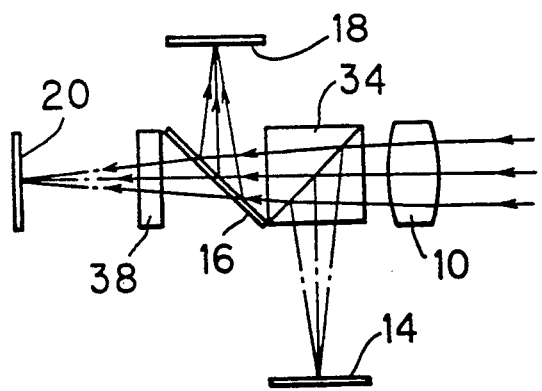
FIGS. 8(A and B) is a drawing showing the schematic diagram of a sixth embodiment according to the present invention.
Figure 8B:
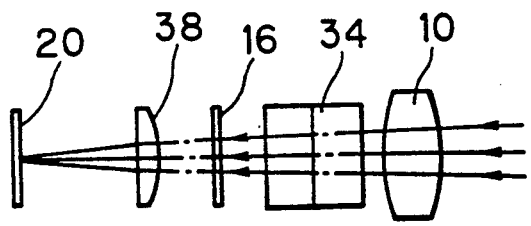

Next, referred to FIG. 8, an explanation is given of Embodiment 6. In this embodiment, a positive "G" cylindrical lens 38 is installed in place of the negative "G" cylindrical lens 36 in the Embodiment 5 shown in FIG. 7.

A feature of this embodiment is that the back-focus is shortened by the "B" reflecting cylindrical lens 34 as shown in the Embodiment 5, and the "G" cylindrical lens 38 shortens the imaging distance in the meridional plane of "G" light to give an imaging point identical with that in the sagittal plane.

EMBODIMENT 7

Figure 9:
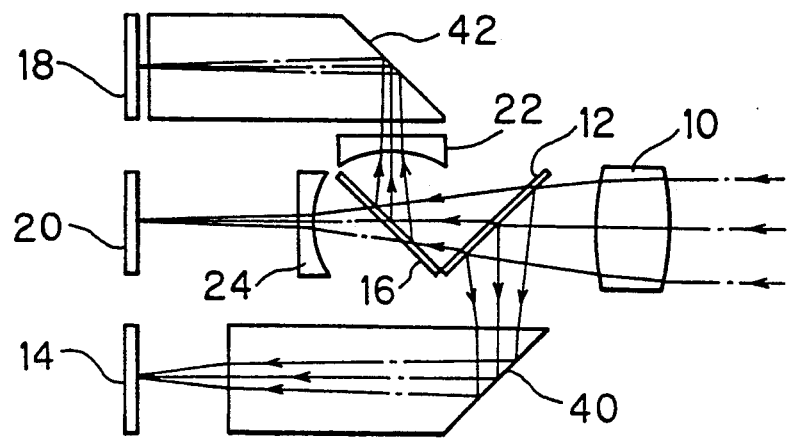
FIG. 9 is a drawing showing the schematic diagram of a seventh embodiment according to the present invention.

Next, referred to FIG. 9, an explanation is given of Embodiment 7. In this embodiment, an optical path-length compensation block 40 is additionally placed between the "B" reflecting dichroic mirror 12 and the image plane 14 of "B". Further, an optical path-length compensation block 42 is placed between the "R" cylindrical lens 22 and the image plane 18 of "R" in the Embodiment 1 shown in FIG. 3. The optical path-length compensation blocks, 40 and 42 make the image planes 18, 20, and 14 of "R", "G", and "B" align with the same plane.

EMBODIMENT 8

Figure 10:
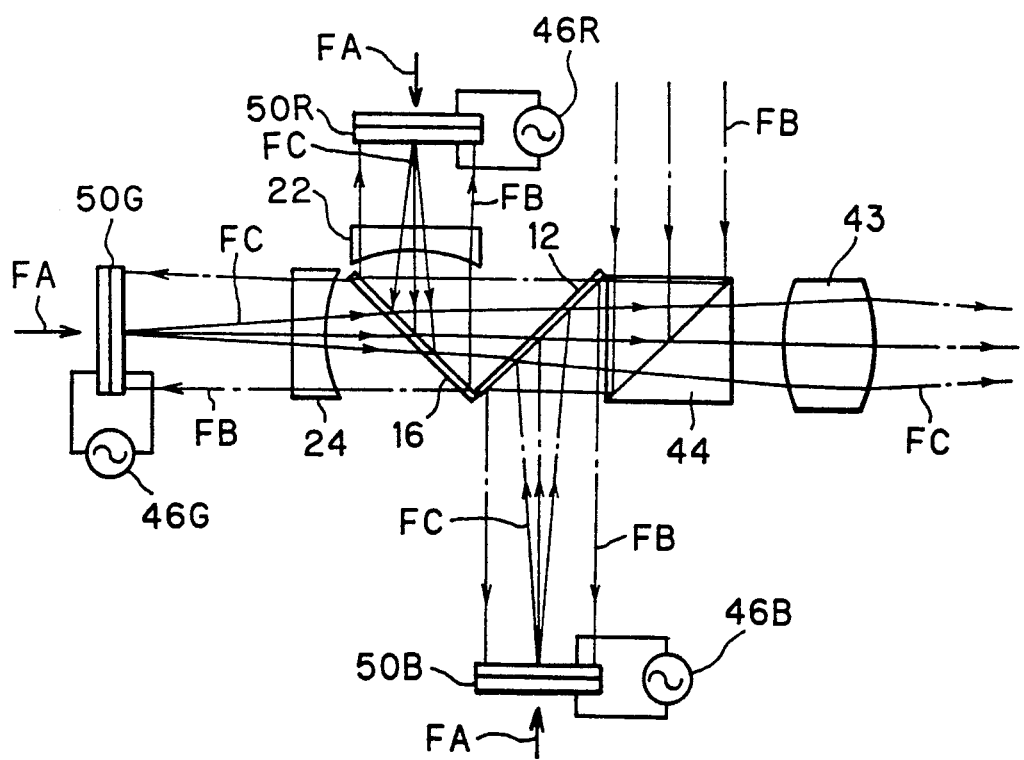
FIG. 10 is a drawing showing the schematic diagram of a eighth embodiment according to the present invention.

Next, referred to FIG. 10, an explanation is given of the Embodiment 8. This embodiment is an application of Emodiment 1 shown in FIG. 3 to a projection type display using a spatial light modulator element. The present embodiment is an example of a color composing optical system while Embodiment 1 is that of a color separating optical system. However, because of the reversibility of light, both embodiments take a similar configuration. In this Figure, a polarizing beam splitter 44 for deflecting and passing reading light is installed between the "B" reflecting dichroic mirror 12 and a projection optical system 43 installed in place of the image lens 10 of FIG. 3. In addition, the image planes 18, 20, and 14 in FIG. 3 are replaced with spatial light modulator elements 50R, 50G, and 50B which are connected to power supplies 46R, 46G, and 46B, respectively.

Figure 14:
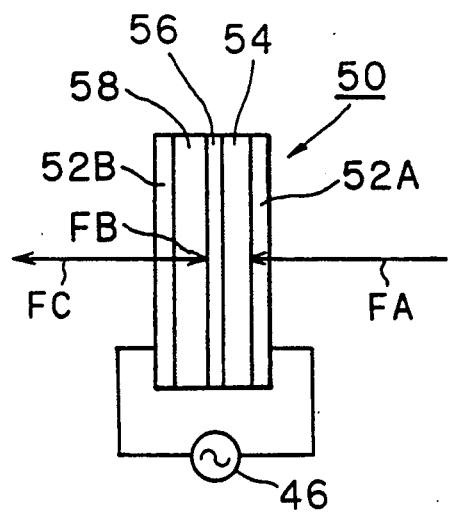
FIG. 14 is an explanatory drawing showing one example of a spatial light modulator element.
Figure 13:
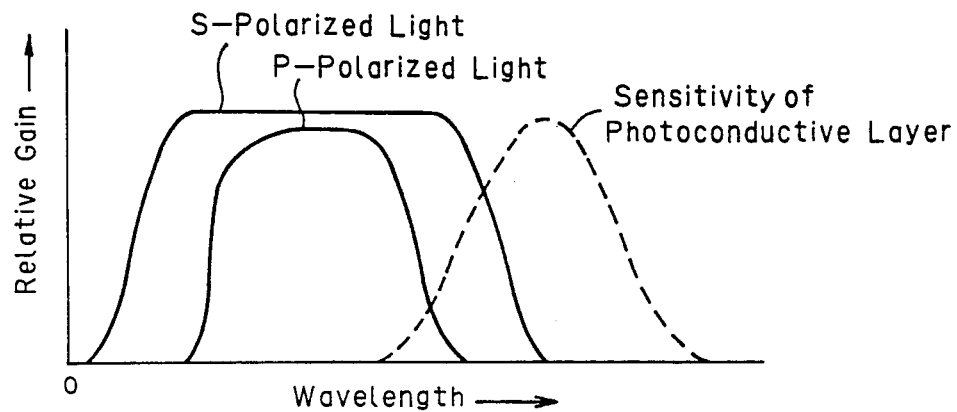
FIGS. 13(A and B) is a drawing showing the schematic diagram of an eleventh embodiment according to the present invention.
Figure 13:
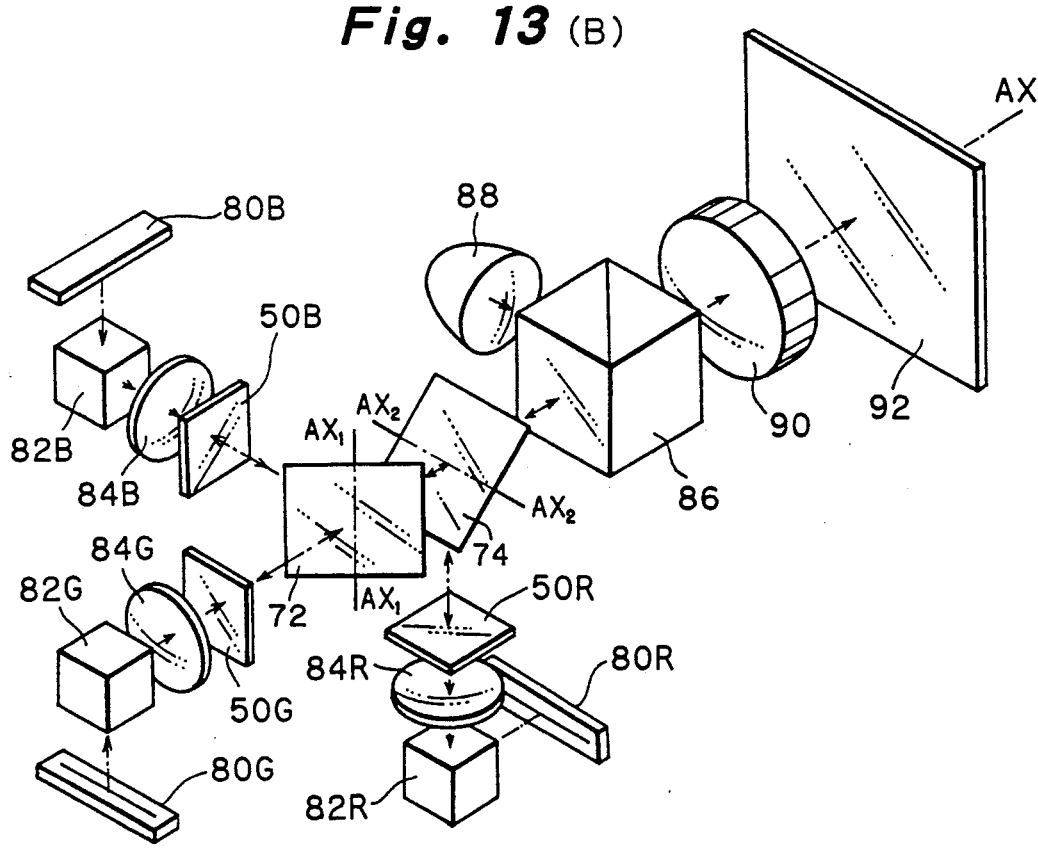

The spatial light modulator elements 50R, 50G, and 50B have a structure shown in FIG. 14. A photoconductive layer 54, a dielectric mirror 56, and a photomodulation layer 58 are laminated between a pair of transparent electrodes 52A and 52B connected to a power supply 46. The photoconductive layer 54, made of such as amorphous silicon, has a sensitivity in a long wavelength range as shown in FIG. 13(A). A birefringent material, e.g. liquid crystal, is used for the light modulation layer 58, while in the Embodiment 9 to be explained later, a material such as liquid crystal dispersed polymer which functions in a scattering mode, is used.

Upon receiving a writing light carrying image information in the direction shown by an arrow FA, conductivity distribution of the photoconductive layer 54 changes in response to an intensity planar distribution of the writing light, and generates an electric field accordingly. As a result, the light modulation layer 58 biased by a voltage of the power supply 46, is subjected to the generated electric field which corresponds to the intensity distribution (sectional) of the writing light. When a reading light shown by the arrow FB impinges on the light modulation layer 58, passing therethrough, being reflected by the dielectric mirror 56, and advancing again through the photomodulation layer 58, the reading light undergoes intensity modulation in accordance with the electric field distribution. The reading light thus intensity modulated, exits from a spatial light modulator element 50 as shown by the arrow FC. Thus, the picture image written into the spatial light modulator element 50 is read out.

Next, the overall operations of the present embodiment are explained as follows:

The spatial light modulator elements 50R, 50B, and 50G to be written with images of "R", "G" and "B", respectively, are each impinged by a writing light as shown by the arrow FA, and the reading light impinges on the polarizing beam splitter 44 as shown by the arrow FB to obtain an S-polarized light outputted therefrom, which is in turn reflected by the "B" reflecting dichroic mirror 12 to enter the spatial light modulator element 50B.

The reading light which has passed the "B" reflecting dichroic mirror 12, is reflected by the "R" reflecting dichroic mirror 16 and passes the "R" cylindrical lens 22, then enters the spatial light modulator element 50R. The reading light having passed both of the "R" reflecting dichroic mirror 16 and "G" cylindrical lens 24, impinges on the spatial light modulator element 50G.

Each of the spatial light modulator elements, 50R, 50G and 50B, modulates the impinged reading light correspondingly with the written image. Thus modulated "R", "G" and "B" light beams go back along respective paths via the cylindrical lenses 22 and 24 (except for the "B" light beam) and the dichroic mirrors 12 and 16, as shown by the arrow FC, forming an "R" "G" "B" composed single beam which enters the polarizing beam splitter 44 from which a P-polarized light only is outputted and projected out through a projection optical system 43.

EMBODIMENT 9

Figure 11:
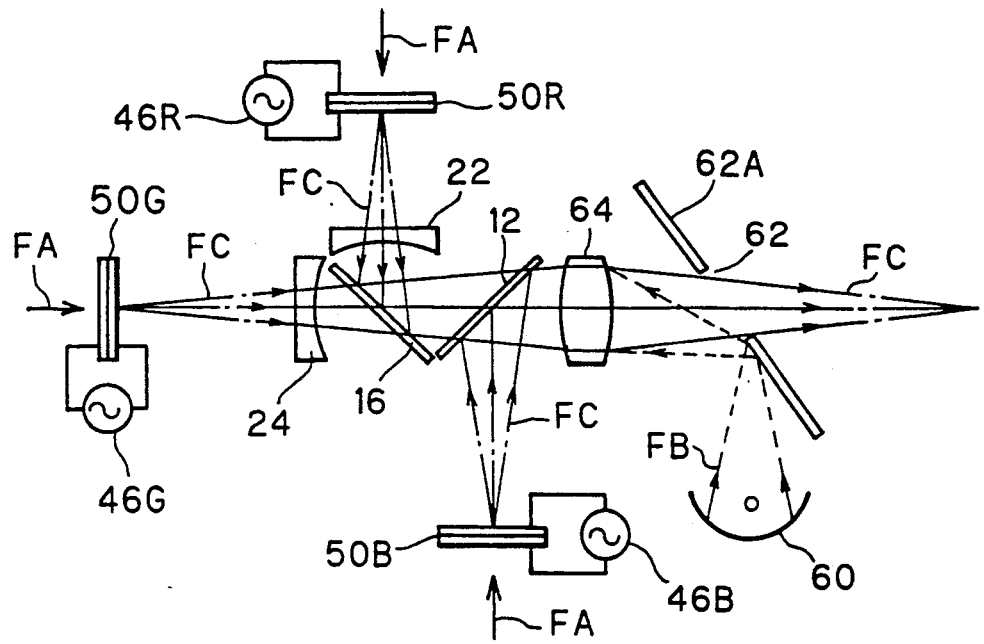
FIG. 11 is a drawing showing the schematic diagram of a ninth embodiment according to the present invention.

Next, referred to FIG. 11, an explanation is given of the Embodiment 9. In this embodiment, the reading light is emitted from a light source 60 and is reflected by a masking part 62A having a pin-hole 62 to impinge on an optical system 64. After that, the light advances to spatial light modulator elements 50R, 50G and 50B, similar to the case in the Embodiment 8 as being separated into "R", "G" and "B".

In this embodiment, scattering mode material is used for the light modulation layer 58 of the spatial light modulator elements 50R, 50G and 50B. For this reason, the masking part 62A is provided to cutoff a scattered component of the light and the pin-hole 62 allows to pass the composed light which is projected out of this system.

EMBODIMENT 10

Figure 12:
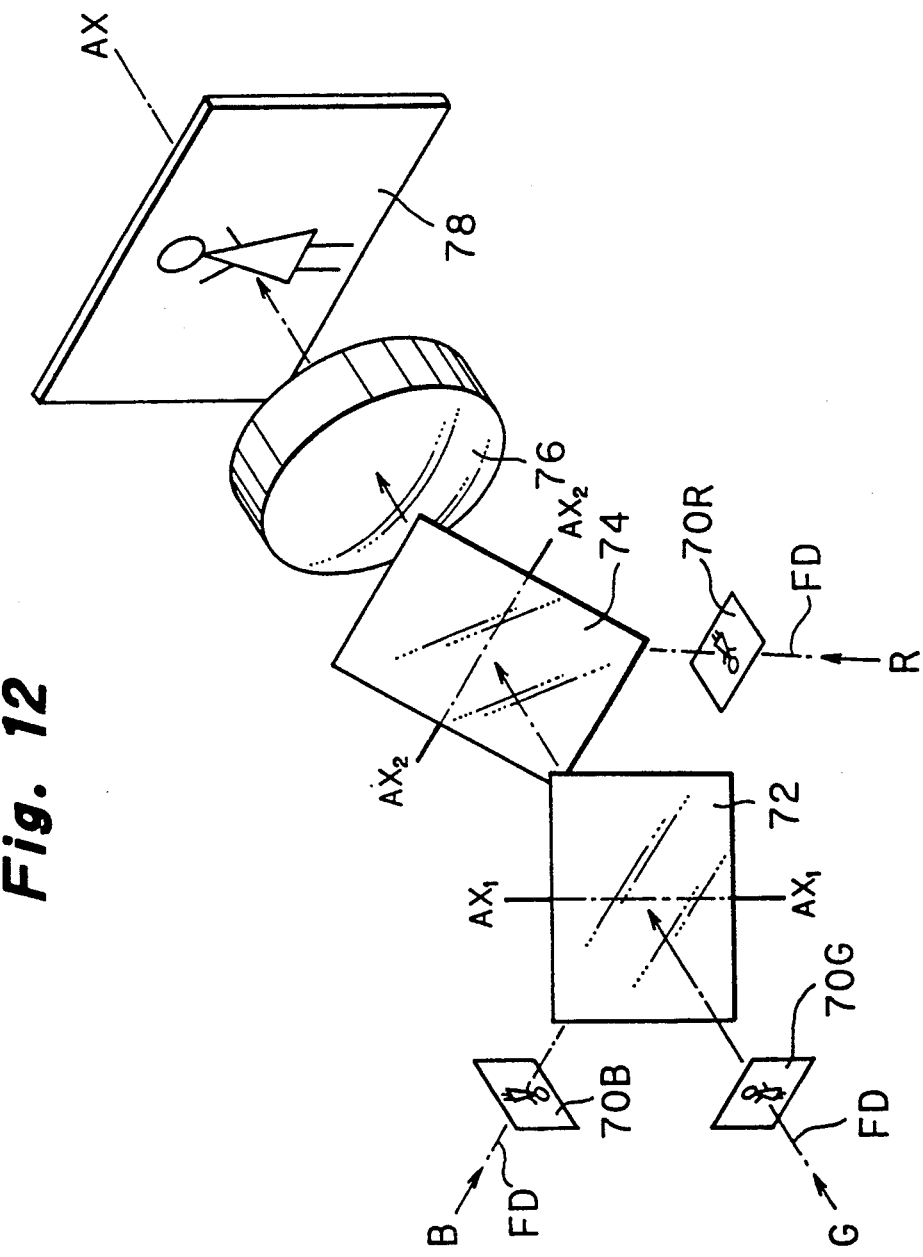
FIG. 12 is a drawing showing the schematic diagram of a tenth embodiment according to the present invention.

Next, referred to FIG. 12, an explanation is given of the Embodiment 10, in which cylindrical lenses used in the previous embodiments for correcting astigmatism in the paraxial region, are eliminated.

In FIG. 12, the films 70R, 70G and 70B recorded respectively with images of "R", "G", and "B", are irradiated with reading lights of "R", "G", "B", as shown by arrows FD. In this case, the light passed the "G" film 70G enters and passes a "B" reflecting dichroic mirror 72 and advances along an optical axis AX of a projection optical system 76. The light passed the "B" film 70B enters the "B" reflecting dichroic mirror 72 and is reflected thereby to proceed along the same optical axis AX. Thus, the "G" and "B" lights outgoing from the "B" reflecting dichroic mirror 72 enter and pass through an "R" reflecting dichroic mirror 74. The light passed the "R" film 70R enters the "R" reflecting dichroic mirror 74 and is reflected thereby to proceed along the same optical axis AX so that the 3 lights "R" "G" "B" are composed to form a single beam which is projected on a screen 78 through a projection optical system 76. Accordingly, the picture images on the films, 70R, 70G and 70B, are projected on the screen 78 as a full color image.

In this particular embodiment, the dichroic mirrors 72 and 74 are arranged in such a way that an imaginary plane defined to include the optical axis AX and a line perpendicular to the "B" reflecting dichroic mirror 72, is perpendicular to another imaginary plane defined to include the same optical axis AX and another line perpendicular to the "R" reflecting dichroic mirror 74. Exemplary, the "B" reflecting dichroic mirror 72 is swung 45 degrees from a plane perpendicular to the optical axis AX around a rotational axis AX1 which intersects the optical axis AX vertically, and the "R" reflecting dichroic mirror 74 is swung 45 degrees from another plane perpendicular to the optical axis AX around another rotational axis AX2 which intersects the optical axis AX laterally and is perpendicular to the rotational axis AX1. Whereas in other embodiments which utilize those 2 reflecting dichroic mirrors 12 and 16, their rotational axes are parallel each other.

It should be noted that by arranging the two dichroic mirrors 72 and 74 as above, the astigmatism caused in the "B" reflecting dichroic mirror 72 is cancelled out by that caused in the "R" reflecting dichroic mirror 74, thus no cylindrical lenses are required. Embodiment 11

FIG. 13(B) shows the Embodiment 11 to which the dichroic mirror arrangement explained in the embodiment 10 is applied. When the reflection-type spatial light modulator element 50 as shown in FIG. 14, has a photoconductive layer 54 made of such as amorphous silicon, a sensitivity of the photoconductive layer 54 resides in a long wavelength range (red region) with respect to the S-polarized and P-polarized components of the reading light projected from a light source 88 as shown in FIG. 13(A). On the other hand, the reading light generally having much higher intensity than writing light tends to lead into the photoconductive layer 54, and an intensity of such leakage component becomes often comparable to that of the writing light. For this reason, when the reading light is in the long wavelength range, i.e. biased to red, the photoconductive layer 54 is subject to such reading light and behaves lower in sensitivity with respect to the writing light, and renders displayed images of poor contrast ratio. In consideration of this, the present embodiment adopts a sophisticated filter arrangement by which a P-polarization component of the reading light irradiates the spatial light modulation element 50R because of the fact that a wavelength range of the P-polarized light resides substantially out of the sensitivity response range of the photoconductive layer 54 as can be seen from FIG. 13(A).

In FIG. 13(B), linear light beams carrying information of images of "R", "G" and "B" are emitted from linear light emitting devices 80R, 80G and 80B respectively. Deflectors 82R, 82G and 82B are installed to deflect the emitted linear light beams respectively, thus deflected light beams respectively impinge on the spatial light modulator elements 50R, 50G and 50B through writing optical systems 84R, 84G and 84B and scan the spatial light modulator elements 50R, 50G and 50B to write images of "R", "G" and "B" line-sequentially thereon. Like in the embodiment 10, the "B" and "R" dichroic mirrors 72 and 74 are placed as a color separating/composing optical system intersecting the optical axis AX and receiving output lights from the spatial light modulator elements 50R, 50G and 50B. A polarizing beam splitter 86 is installed on the optical axis AX to reflect the reading light projected from the light source 88 and to allow passing a beam of light projected from the "R" reflecting dichroic mirror 74. The beam of light passed through the polarizing beam splitter 86, proceeds to a screen 92 through a projection optical system 90.

Operational features of this embodiment are as follows: As in the embodiment 8 in FIG. 10, the polarizing beam splitter 86 reflects the S-polarized component (linearly polarized and viewed from the beam splitter 86) of the reading light emitted from the light source 88, thus reflected S-polarized light impinges on the "R" reflecting dichroic mirror 74, where an "R" component having "P"-polarization (viewed from the beam splitter 86), is reflected toward the spatial light modulator element 50R.

This "R" reflecting dichroic mirror 74 is placed so that its rotational axis AX2 is made perpendicular to the plane of polarization of the incident S-polarized light. In other words, the rotational axis AX2 is made parallel with the normal vector of the plane of polarization of S-polarized light, as a result, a P-polarized light is reflected to impinge on the spatial light modulator element 50R.

The S-polarized reading light reflected by the polarizing beam splitter and passed through the "R" reflecting dichroic mirror 74 is decomposed into light beams of "G" and "B" by the "B" reflecting dichroic mirror 72, and the decomposed light beams impinge on the spatial light modulator elements 50G and 50B respectively. Intensity modulated light beams reflected back from the spatial modulator elements 50G, 50B and 50R, are color-composed by the "B" and "R" reflecting dichroic mirrors 72 and 74. The color composed single beam of light is projected to the screen 92 via the polarized beam splitter 86 and the projection optical system 90. In this case, since the "B" and "R" reflecting dichroic mirrors 72 and 74 have the same arrangement in the Embodiment 10, the astigmatism of "G" light arising in the paraxial region can very well be eliminated.

Further investigation of the "R" light viewed from the side of the screen 92 indicates that the P-polarized component returns back through the polarizing beam splitter 86 and is projected onto the screen 92. This results in overall that the light projected on the screen 92 has a wavelength spectrum equivalent to a product of an S-polarized light spectrum multiplied by a P-polarized light spectrum in FIG. 13(A), that is virtually in the P-polarized light spectrum of FIG. 13(A).

When viewed from the screen 92, this relation holds even when the reading light incident on the spatial light modulator element 50R, is S-polarized. Consequently, even when the reading light impinging on the spatial light modulator element 50R is P-polarized as in this embodiment, no significant brightness loss occurs of the projected images. Thus, according to the present embodiment, prevention of lowering an effective sensitivity of "R" spatial light modulator element 50R as well as reduction of astigmatism, and improvement in the contrast ratio of the projected images, are achieved.

OTHER EMBODIMENTS

The scope of this invention is not limited to the embodiments explained in the foregoing, but it also includes the following:

(1) Because of the reversibility of light, those embodiments showing color separation are applicable to color composition optical systems as well.

(2) The configuration regarding "R", "G" and "B" lights can be other than those shown in the embodiments without losing the features of the present invention i.e. "R" "G" "B" are virtually interchangeable each other.

Figure 15:
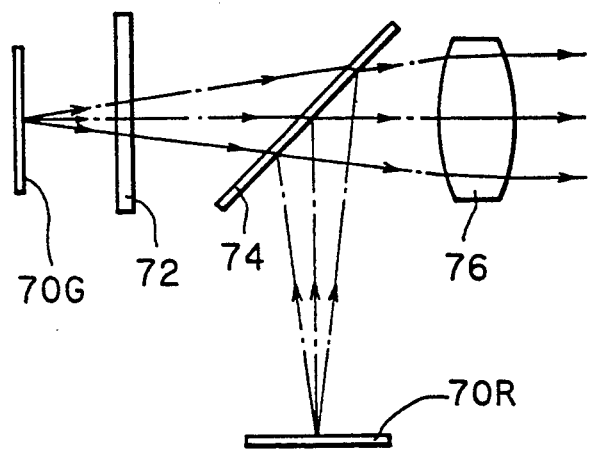
FIGS. 15(A and B) is a drawing showing the schematic diagram of another embodiment according to the present invention.
Figure 15:
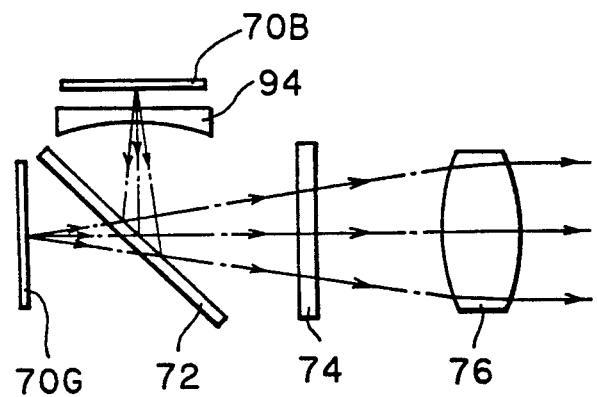

(3) If necessary, it is possible to modify an arrangement of embodiment extensively as such that the Embodiments 2-7 are applied to the Embodiments 8 and 9 or the optical pathlength compensation block as used in the Embodiment 7 may be inserted in each of the optical paths of "R", "G" and "B" as desired. Furthermore, a cylindrical lens may be used for the "B" light in the Embodiments 10 and 11. FIG. 15 shows such an exemplary schematic diagram in which a cylindrical lens 94 for "B" is used additionally to the Embodiment 10.

(4) While amorphous silicon is used for forming the photoconductive layer of spatial light modulator element for the P-polarized reading light, other material can be used for the photoconductive layer.

As explained in the foregoing, the color separating-/composing optical system of the present invention has the following effects:

(1) Insertion of cylindrical lens in the optical path of the light passing the color filter (dichroic mirror), significantly reduces the astigmatism caused in color separation or color composition process. This results in the improvement of resolving power and cost.

(2) Arrangement of color filters (dichroic mirrors) shown in the embodiments 10 and 11, significantly reduces with simple components the astigmatism caused in color separation or color composition process.

(3) Considering the wavelength dependent sensitivity response of the photoconductive layer and the wavelength band of polarized lights for reading, polarization of reading lights is carefully selected by the color filter arrangement (dichroic mirrors) to minimize the overlap between the sensitivity response of the photoconductive layer and the band of polarized reading light. This prevents reduction of effective sensitivity in the spatial light modulator element, thus improves the contrast ratio of displayed images.

What is claimed is:

1. Color separating or composing optical system having an optical axis, comprising two color filters being placed on said optical axis to perform color separation or composition by color-selective reflection and passing of reading lights for reading color images written separately on respective light modulators, one of said light modulators having a photoconductive layer with a higher sensitivity in a first wavelength range, said two color filters are arranged in such a manner that a polarization of one of said reading lights impinging on said one of said light modulators, is selected to have a wavelength range which is substantially shifted from said first wavelength range so that an overlap between the wavelength range of said one of the reading lights and said first wavelength range, is minimized.

2. A color separating or composing optical system claimed in claim 1 wherein said two color filters are arranged as such that an imaginary plane defined to include the optical axis and a line perpendicular to one of the two color filters, is perpendicular to another imaginary plane defined to include the optical axis and another line perpendicular to the other of the two color filters.

* * * * *